US007448034B2

United States Patent
Anderson et al.

(10) Patent No.: US 7,448,034 B2
(45) Date of Patent: Nov. 4, 2008

(54) BUILD TIME DETERMINATION AND INSTALLATION OF DRIVERS ON CLONED SYSTEMS

(75) Inventors: Timothy M. Anderson, Rockford, IL (US); Warren J. Baumann, Monroe, NY (US)

(73) Assignee: International Business Machines Corporation, Armonk, NY (US)

( * ) Notice: Subject to any disclaimer, the term of this patent is extended or adjusted under 35 U.S.C. 154(b) by 705 days.

(21) Appl. No.: 10/630,257

(22) Filed: Jul. 30, 2003

(65) Prior Publication Data
US 2005/0027831 A1 Feb. 3, 2005

(51) Int. Cl.
*G06F 9/445* (2006.01)
(52) U.S. Cl. .................. 717/176; 717/121; 717/175
(58) Field of Classification Search .................. 717/176, 717/178, 121, 175; 709/220
See application file for complete search history.

(56) References Cited

U.S. PATENT DOCUMENTS

| | | | | |
|---|---|---|---|---|
| 5,220,654 | A | 6/1993 | Benson et al. ............... | 395/275 |
| 5,668,992 | A | 9/1997 | Hammer et al. ............. | 395/651 |
| 5,999,730 | A | 12/1999 | Lewis ......................... | 395/702 |
| 6,096,094 | A | 8/2000 | Kay et al. ..................... | 717/1 |
| 6,145,028 | A | 11/2000 | Shank et al. ................ | 710/31 |
| 6,161,151 | A | 12/2000 | Sudhakaran et al. .......... | 710/10 |
| 6,311,149 | B1 | 10/2001 | Ryan et al. .................. | 703/21 |
| 6,327,623 | B2 | 12/2001 | Watts ......................... | 709/229 |
| 6,349,274 | B1 | 2/2002 | Kay et al. ..................... | 703/13 |
| 6,378,128 | B1 | 4/2002 | Edelstein et al. ............ | 717/174 |
| 6,938,250 | B2 * | 8/2005 | Cohen et al. ................ | 717/178 |
| 7,185,336 | B2 * | 2/2007 | Vaughan ..................... | 717/178 |
| 7,356,679 | B1 * | 4/2008 | Le et al. ........................ | 713/1 |
| 2002/0091805 | A1 * | 7/2002 | Phillips et al. .............. | 709/220 |

OTHER PUBLICATIONS

"How to Prepare Images for Disk Duplication with Sysprep", Nov. 29, 2001 (3 pages). Online retrieved at <http://microsoft.com/windowsxp/pro/using/itpro/deploying/duplication.asp>.*
Patent Application POU920020111US1 "Build Time Dynamic Installation of Drivers on Cloned Systems", Warren J. Baumann, filed Apr. 30, 2003, U.S. Appl. No. 10/427,390.

* cited by examiner

*Primary Examiner*—Tuan Q. Dam
*Assistant Examiner*—Thuy Dao
(74) *Attorney, Agent, or Firm*—John E. Campbell; Jose Gutman; Fleit Gibbons Gutman Bongini & Bianco P.L.

(57) ABSTRACT

A replica image of a computer system is loaded to a target computer system being built. A detection program running on the target computer system detects configuration information and attached devices and provides this information to a build program. The build program provides needed program components, applications, prerequisites and device drivers for the target computer according to build rules defined for the target computer type/model. Optionally, the detection program further detects that there are updates required for the detection program and installs the updates before proceeding with the build process.

20 Claims, 6 Drawing Sheets

BUILD TIME DETERMINATION AND INSTALLATION OF DRIVERS ON CLONED SYSTEMS

FIELD OF THE INVENTION

The present invention is related to systems, program products and methods for creating replica computer system program images, more particularly to providing a replica computer system program image then determining and retrieving appropriate program components.

BACKGROUND OF THE INVENTION

Organizations have responsibility for supporting diverse computers and work stations. A medium sized organization may have thousands of diverse models and types of computers that need to be managed and maintained to appropriate levels or versions of applications, operating systems and support hardware (drivers). The organization needs to be concerned with availability, serviceability, new installations, maintenance and security.

When adding a computer or workstation, organizations often supply a standard computer system "image" of software (including an Operating System) to the new computer. The image must be customized according to machine type, model and peripheral attachments. The image may also be customized to provide a set of applications and hardware drivers. This allows the organization to maintain a reduced set of images for all of the computers that need to be supported. Even with this technique, the number of images can be large and each image may be large as easily can be seen by the fact that an image must include all of the driver programs that a computer or workstation may need. Managing a large number of versions is a logistics problem but having large numbers of large images creates a need for large storage. Distributing the large images by way of a network is time consuming especially when the network includes a slow protocol or when there is high demand for the network.

Native installation of operating systems and applications can be time consuming and error prone. Realizing this, companies such as PowerQuest and Symantec have developed disk imaging software that takes a "snap shot" of a computer system image and saves it to a file(s). The "snap shots" can be saved on a server and distributed to new clients by way of a network. The saved "snap shot" is a "clone" or "replica" image of the computer system image. The "snap shot" can then be used by other computers by loading the "snap shot" into another identical computer (cloning).

Cloning of a computer image is the process of configuring a master computer system with a specific operating system and set of application programs supporting a specific set of peripheral devices and copying (cloning) the "program image" of this configuration to other (cloned) computer systems. The copied image is a clone of the master computer system image.

Thus, all of the systems cloned have common software (with the same levels and versions of the same software). Cloning simplifies an organization's IT (Information Technology) infrastructure since all of the computers or workstations have the same software. A problem exists with this strategy since a separate clone image must be created to support different computer types and models, hardware configuration differences, device drivers and the like.

Because of its ease of use and fast speed, cloning has solidified its place in the industry by allowing companies to simplify client deployment and reduce costs by putting a client standardization effort in place.

Figure 3:
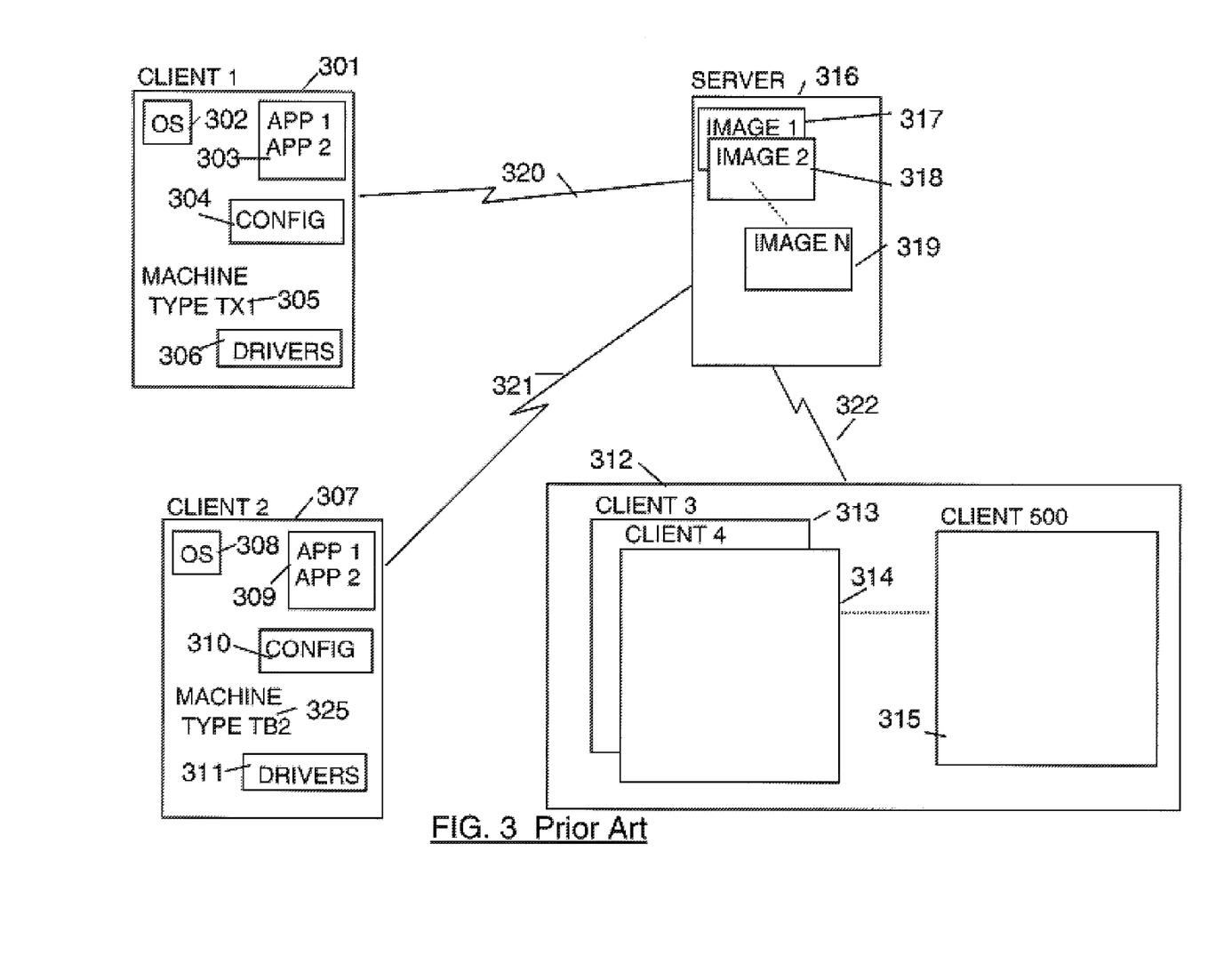
FIG. 3 is a diagram depicting example components of prior art cloned systems.

Referring to FIG. 3, an example cloning process is shown. A client1 301 computer system is configured to represent a desired clone system. It comprises a characteristic machine type/model (TX1) 305, a desired operating system (OS) 302, optional applications 303, desired drivers 306 and desired configuration information 304. The image of client1 301 is then captured and stored as image1 318 in a server 316 storage area. The server 316 holds N images. A client2 307 is to be built. Since the machine type is TB2, desired image2 is deemed appropriate, so it is loaded into the client2 307 via a network connection 321 or CD. Thus, client2 307 becomes a clone of client1 301. The server 316 may support cloning of other computers 312, each one having to select the appropriate image stored in the server 316.

Current cloning software does not address the issue of adding new hardware, driver, and application support to an existing image file. Since replicating system images (cloning) requires that the target system 307 and the source system 301 be exactly the same, large enterprises can sometimes have hundreds or even thousands of cloned images 317-319 on their servers 316 in order to have a cloned image for each supported system configuration. Some operating systems, like WINDOWS® 2000/XP from Microsoft® CORP., have imaging tools that allow a technician to reset the devices that had been previously detected by the operating system. by resetting the devices, the operating system can re-scan for hardware on the next boot of the operating system. Using this method, in a cloned system, requires managing the plug and play driver repository on the cloned system. In order to create a new clone image 318, the technician would clone a known image file 317 containing an operating system with installed and customized applications to a system, boot the operating system, manipulate the driver repository 306 that resides on the client 301 to include new or updated drivers, run the imaging tool, then clone the system image back to the server 316. When the technician saves the "cloned client system" to the server, the technician is saving a snapshot of the operating system 302, applications 303, and hardware support components 304. The snapshot is a version of the computers' operating system that can be cloned (replicated) to other systems that are supported by the updated driver repository 306 or native driver support built into the operating system.

This method isn't without its problems. Plug and play systems force the image to use the latest available driver in the repository where the organization would prefer to have a predetermined version of the driver. Also, updating and adding drivers to the master image file can be tedious, time consuming, and error prone.

MICROSOFT WINDOWS 2000/XP System Preparation Tool (Imaging Tool):

The WINDOWS 2000 System Preparation Tool (Sysprep) enables administrators to prepare WINDOWS 2000 System Images part of an automated deployment. Sysprep provides the ability to reduce the number of images required in a deployment by supporting multiple mass storage controllers. Sysprep supports cloning of a computer system's Operating System. Software and settings to create an image that can be deployed to numerous target servers or workstations. If the target system has different capability, plug and play drivers are loaded when the target system is powered up.

Sysprep is designed to create an image file that can be cloned to computers having similar characteristics (type/models). An enterprise may take one image file and add support to thousands of type/models by updating the driver repository on the target system (under c:\pnp). A problem with this scenario is with the difficulty of maintenance of that driver repository.

SUMMARY OF THE INVENTION

The present invention comprises a cloning process where specific drivers for the operating system and specific system type/model being cloned are transferred to the cloned system at build time and includes access to the predetermined drivers required to deploy that system. A clone (replica) image of a computer system of the desired type and model is captured, and components to be added later are removed from the captured image (the clone image). The image is saved at a server. When a client is introduced that needs to be configured, the clone image corresponding to the new client hardware characteristics is loaded into the client. In a preferred embodiment, the clone image that is to be loaded into the client has no driver software included. This makes the clone image much smaller. An install program comprising an interrogation program detects attributes of the client (or target) system. The install program creates a component list comprising information about attached devices, configuration information such as amount of memory, and machine type and model number. The component list is sent to the build server that reviews the component list in conjunction with a set of predetermined rules. The build server assembles the required components, including device drivers and component programs, and transmits them to the target computer system. Only the needed drivers or programs are loaded to the target (cloned) computer, and the target computer is booted with the required drivers.

Before cloning the target system, a cloning preparation tool is configured to look in a predefined location on the primary partition for the driver repository.

The user clones the operating system image to the target system.

After the operating system has been cloned, a program scans the bus of the system target system and generates a list of devices to be installed. A program then contacts the build server and requests predetermined rules for the hardware identified. This program also requests rules for the type or model detected and software to be potentially installed on the system, using the type/model information of the target computer, reads the information (from a server side database or table) about the type/model that is to be built. Included in the information obtained from the server is the particular driver information required to build that type/model as well as the common drivers that are needed on the system. The program accesses predetermined rules in order to select the required drivers and programs as well as install prerequisites and install sequences to be used.

The program then transfers the necessary driver files and programs to the target computer system partition and drivers are sent in the correct driver repository.

The target system is booted and all device drivers and applications are installed at the desired versions.

It is an object of the present invention to create a clone image without components including drivers.

It is also an object of the present invention to provide a subset of available drivers to a cloned image, the subset determined by predetermined rules and target computer hardware information, the information comprising type, model or a predefined user input parameter.

It is yet another object of the present invention to provide a program to a target client system wherein the program interrogates the target system hardware information and produces a request to a remote server for a clone image or components (such as drivers) appropriate for the target system.

The above as well as additional objectives, features, and advantages of the present invention will become apparent in the following written description.

Figure 1:
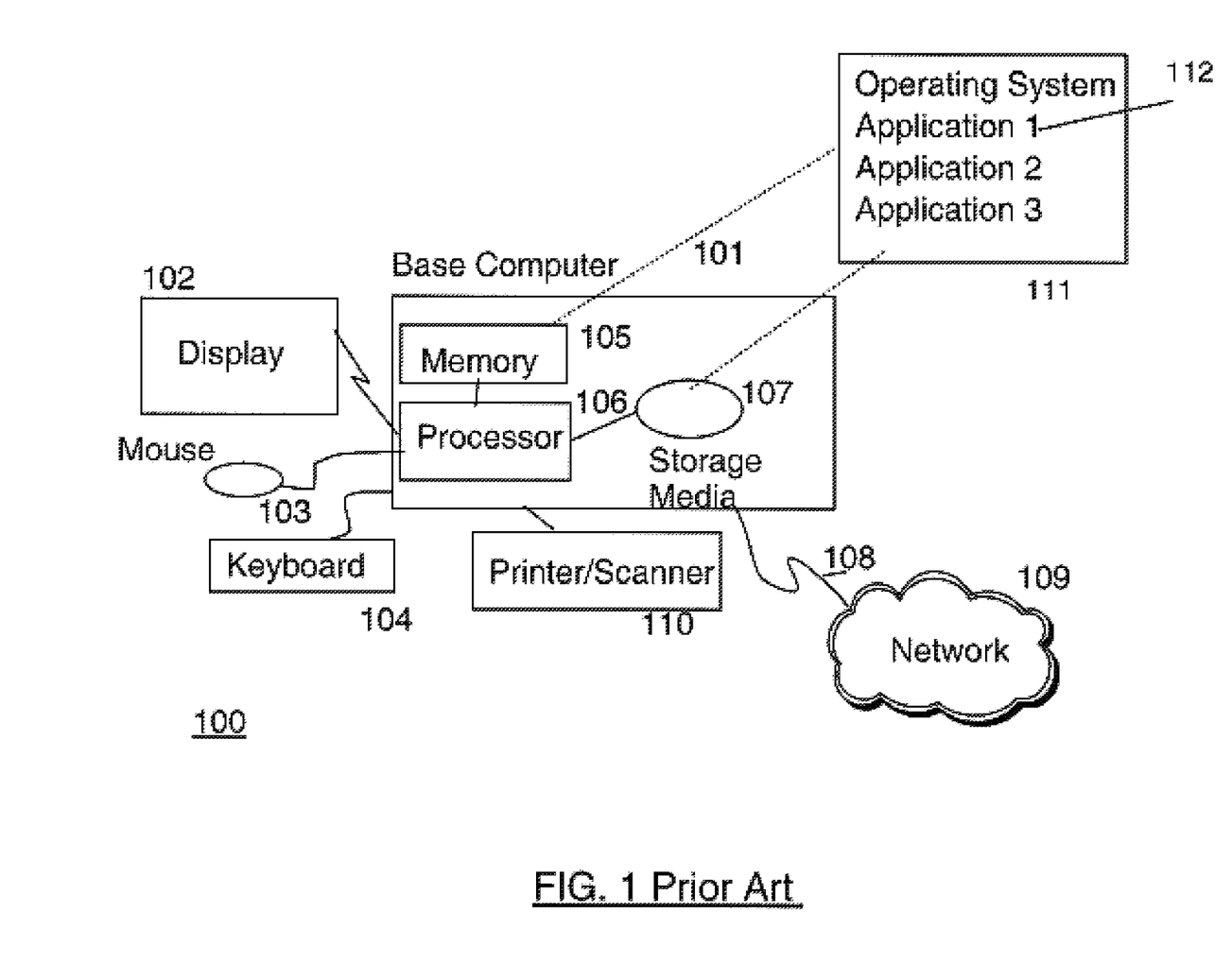
FIG. 1 is a diagram depicting example components of a prior art computer system.

DESCRIPTION OF THE PREFERRED EMBODIMENTS:

FIG. 1 depicts the elements that make up a typical computer for use in presenting and maintaining an application. The computer 100 consists of a Base Computer 101 which comprises a processor 106, a computer readable storage media such as a magnetic disk 107 and a high speed volatile main memory 105. An operating system and application programs 111 reside on the computer readable storage media 107 and are paged into main memory 105 as needed for computations performed by the processor 106 . . .

The Base computer may include optional peripheral devices including a video display 102, a printer or scanner 110, a keyboard 104, a pointing device (mouse) 103 and a connection 108 to a network 109. In a client environment, a user will interact with a (Graphical User Interface) GUI by use of a keyboard 104 and mouse 103 in conjunction with the display of information on the display 102 under control of an application program (application 1) 112. The client application program 112 will then interact with remote users by way of the network 109.

Figure 2:
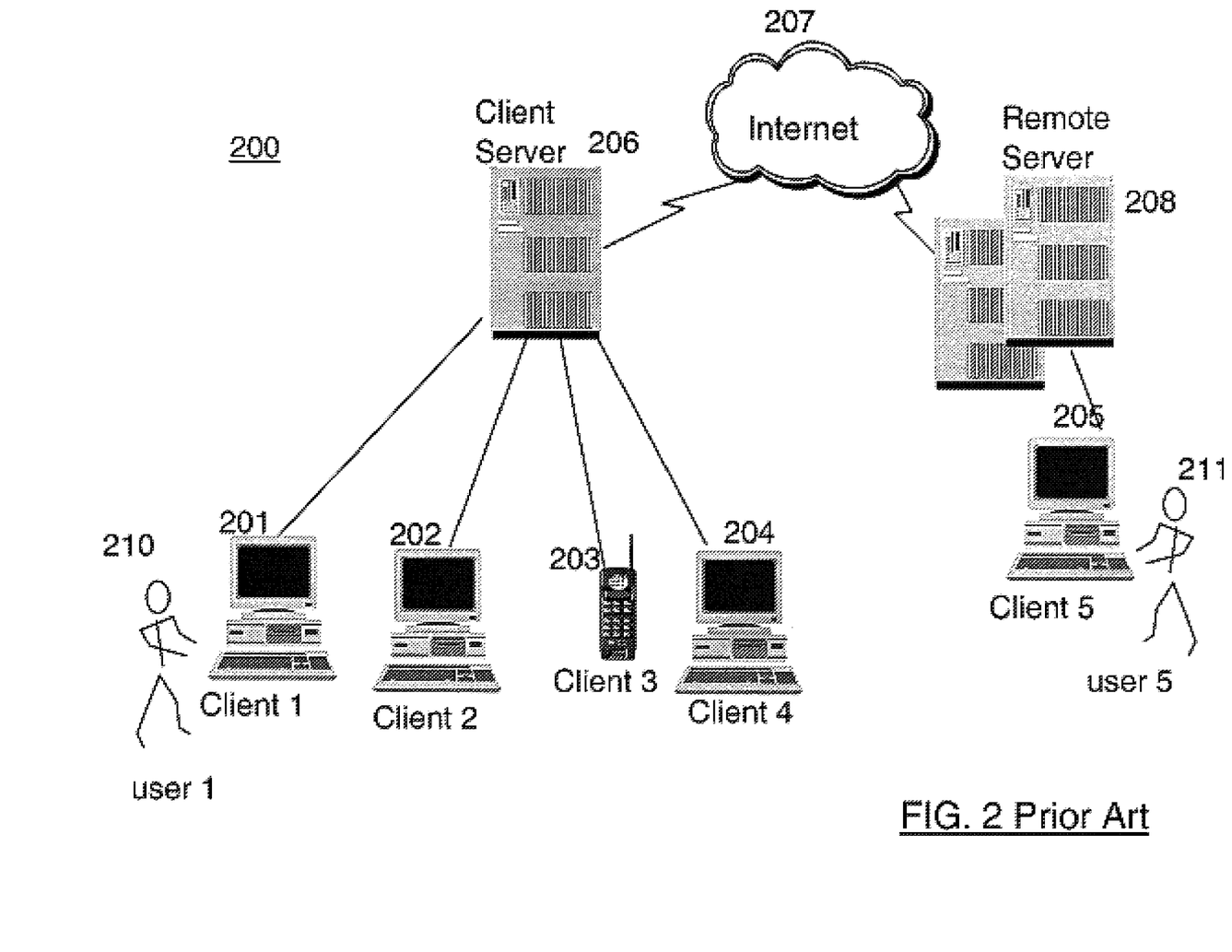
FIG 2 is a diagram depicting example components of a prior art client-server network.

In FIG. 2 an example Internet system is shown. A user1 210 at client1 201 uses applications on his system. User1 210 at client1 201 can interact with client2-client4 202-204 by way of a client server computer 206. Applications 112 may be provided by each client1-client5 201-205 and/or the client server 206 or some remote server 208 by way of the network 207. The user1 210 at client1 201 can interact with a remote user5 211 at client5 205 by way of the Internet 207.

One way that computers interact via networks such as the Internet is by using the HyperText Transfer Protocol (HTTP) open standard designed by the World Wide Web Consortium (W3C) and standardized as Internet Engineering Task Force (IETF) RFC 2616. It is an intentionally simple and open protocol that is implemented across many heterogeneous computer systems.

One example of a self configuring computer system is taught in U.S. Pat. No. 5,668,992 "Self-Configuring Computer System" assigned to International Business Machines Corp. (IBM®). This patent is incorporated herein by reference. It describes a self configuring computer system which configures and loads appropriate software to support custom configurations without manual intervention by the user or the manufacturer. When the computer is first activated, an "interrogation" module is loaded that scans the system for components requiring specific software to operate. The interrogation module enables a startup module to select software from disk-based files including the proper version of the operating system. This patent does not discuss such functions as: creating a clone image appropriate for a group of computer systems, providing cloned images to computer systems, providing a separate driver table for finding appropriate drivers for the characteristics of a cloned system, adding drivers to a system so that the operating system's plug and play engine will detect and install the necessary drivers. It also does not address build time dynamic installation of drivers on cloned systems.

Patent application Ser. No. 10/427,390 "BUILD TIME DYNAMIC INSTALLATION OF DRIVERS ON CLONED SYSTEMS" filed on Apr. 30, 2003 assigned to IBM describes a cloning method providing a predefined table of components for a cloned system and is incorporated herein by reference.

In a preferred embodiment of the present invention (reference FIG. 4), a cloning computer program is provided for creating a single replica (clone) computer system program image 401. A computer system 301 is prepared for a cloning operation. The preparation configures a computer system 301 that has required characteristics of target computer systems that are to become replicas. Target computer systems 307 and 312 will be the recipients of the clone image 401. A set rules 402 for building the target computer 307 is also created that preferably contains identifiers identifying desired components such as device drivers for a predefined group of computer systems compatible with the characteristics required. The rules 402 preferably contain rules for sequencing the installation of components and prerequisites as well as component version appropriate for the combination of operating system and client support requirements. The set of rules 402 includes a first identifier of a first component. Each identifier may include a component name, the location of where to get the component, the parameters needed to assist a program in retrieving the component, a component version indicator and the like.

Figure 4:
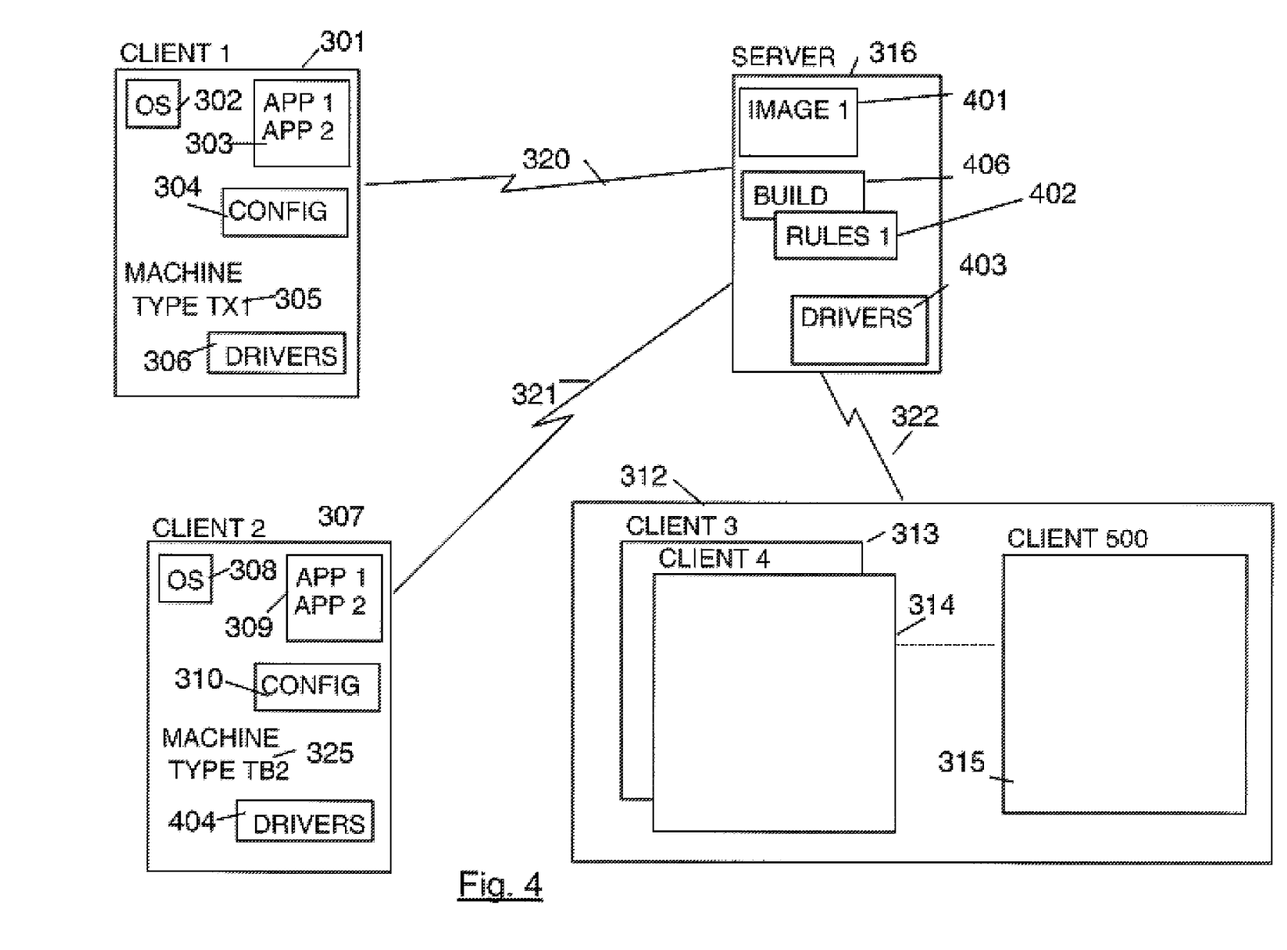
FIG. 4 is a diagram of components of cloned systems of the present invention.

The single clone image 401 of the desired computer system program of computer system 301 includes an operating system and preferably has some or all of the initial components 303 and 306 deleted. The clone image 401 is transferred to a second computer system 307. Preferably, an interrogation program running at the second computer system 307 verifies that the interrogation program is the correct version by communicating with the build program 406 at the build server 316. The interrogation program further detects attributes of the second computer system 307 including the type and model 325 and amount of installed memory of the second computer system 307. The interrogation program further detects devices attached to the second computer system 307. Programs that perform interrogation of attributes and devices when a system is "booted" (power up sequence) are called wizards in operating systems such as WINDOWS® 2000 from Microsoft Corporation. Such wizards are run on built computer systems and depend on functionality of devices having been previously installed. They further depend on having access to device drivers that have previously been loaded.

The interrogation program scans the target system, generates a list of device ids, queries the server database for matching rules, then, base on the rules, it gets code and instructions on what to do with that code. The build program 406 uses the results in association with build rules 402 to determine the components needed by the target computer 307. The components preferably comprise device drivers, configuration information, application programs and install instructions or sequences.

The components 403 needed to complete build are sent to the second system 307. The first identifier in the component list is used to locate the first component and insert it into transferred clone image 401 on the second system 307.

We will refer to the new system to be created using a common (cloning) system image 401 as the target system 307. The common (cloning) system image 401 is the cloning image and is defined for an imaginary system we call the template system. Before cloning the target system 307 the cloning preparation tool is configured to look in a predefined location on the primary partition of the target system 307 for the driver repository. The user clones the operating system 302 to the target system 307. After the operating system has been cloned a cloning program reads the information about the target system type/model from the build's dynamically created response file in the target system 307.

The cloning program transfers the drivers 403 to the primary NTFS preferably using a tool such as "Pqaccd.exe" from PowerQuest. Pqaccd.exe enables one to write to NTFS Partitions. NTFS partitions are ordinarily protected from user access and the PowerQuest tool is able to access these partitions. The image files created are saved as NTFS partitions. Pqaccd.exe is a tool/executable that permits one to edit the protected partition. The program transfers the drivers to the primary NTFS partition in the correct driver repository. FAT, FAT32, and NTFS are different partition/file system types. Different partition/file types (depending on the file system) provide better security, support for larger hard drives, and speed. The PowerQuest tool then edits the driver repository located on the primary partition (adds the driver support). The target system is booted and all device drivers are installed at the desired version, according to the definition for that model/type in the database or table.

Description of File Names Used:

"mtbchknt.exe" —A program written to read the type/model information about a system from an input file then perform actions based on the values in the input file.—This program does most of the work according to the present invention.

"mrf.ini" —the build input file. Generated by selections chosen by the user and type/model specific information retrieved from server.

"config2k.exe" —GUI mode program used to install type/model specific software.

"pqaccd.exe" —A third party tool developed by PowerQuest to write to NTFS partitions.

"sysprep.inf" —control file for the MICROSOFT Clone Preparation Tool "Sysprep"

"mtb.ini" —master type/model table. Contains the type/model specific build information for ever supported system. During the build process the information stored in this table is transferred to the build response file (mrf.ini).

"c4ebcust" —GUI mode install control program.

"IBM Standard Client Installer (ISCI)" —Build process used by clients deployed within IBM.

The technical details for a preferred implementation are as follows:

After the clone operation is complete at the target system 307, an interrogation program at the target system 307, in network communication with a build program 406 at the build server 316, checks the build server database to ensure that the latest version of the interrogation program is running. If a newer version exists, it is downloaded to the target system 307 and started, replacing the old interrogation program.

The interrogation program scans the PCI bus of the system 307 (or whatever interconnect bus that is being used by the system), and generates a device list of detected devices attached to the target system. The program also detects the type/model 325 of the system 307 and any other hardware information available 310 about the system including but not limited to amount of memory (RAM), processor speed, hard disk space and the like).

Based on the device list, the client contacts the build server 316 database. The build program 406 at the build server has access to "rules" 402 that determine what happens to the client based on the devices detected and user specific requirements if needed.

Figure 5:
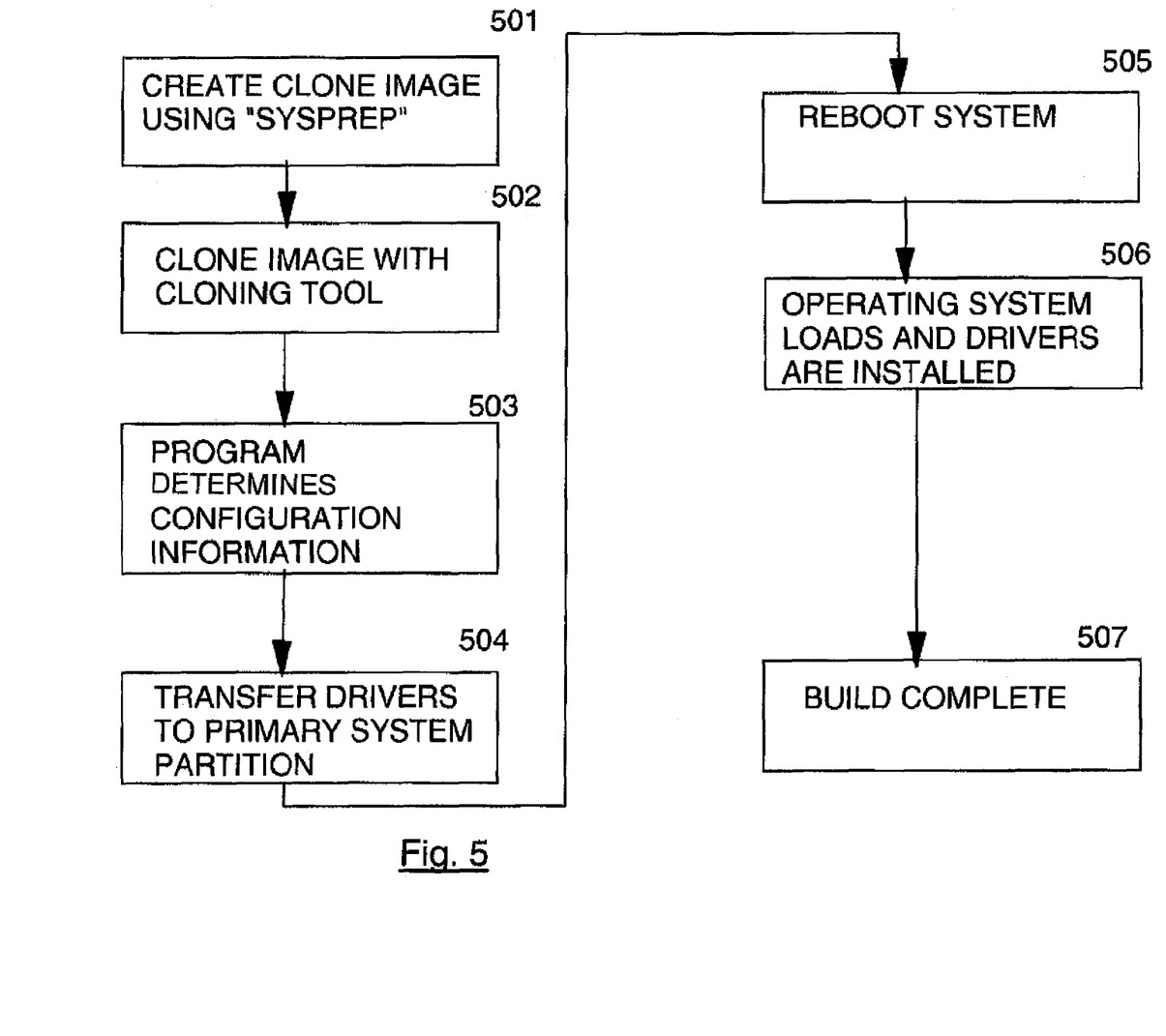
FIG. 5 is a flow chart depicting steps of cloning.
Figure 6:
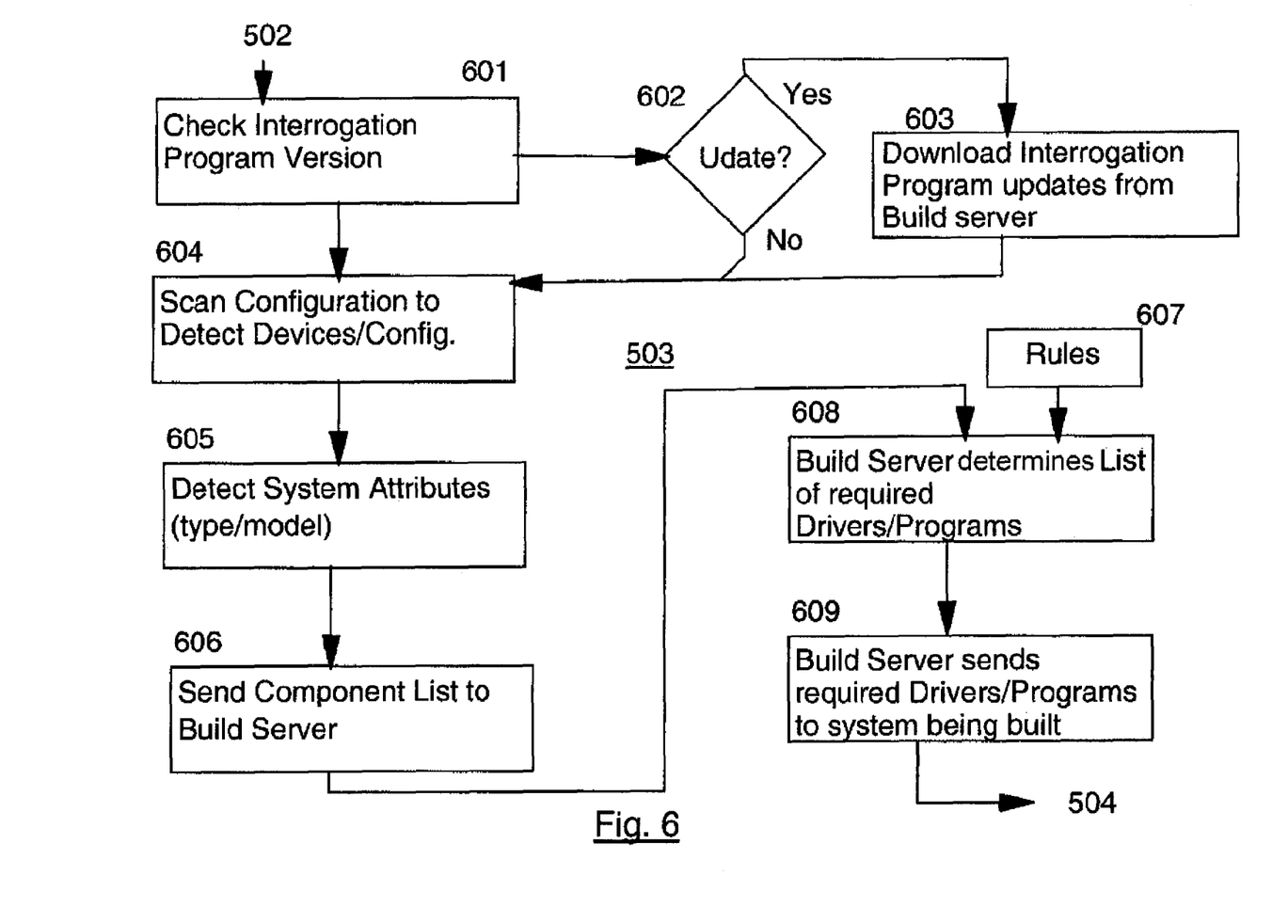
FIG. 6 is a flow chart depicting steps of cloning of the present invention.

Referring to FIG. 5, the clone process begins by creating a clone image 501 of a desired system. The clone image is preferably saved at a build server so it is available via a network to target systems. The clone image could also be distributed by CDRom or other techniques known in the art. A cloning tool running at a target computer clones the image to the target computer. A program preferably comprising an interrogation program determines configuration information 503 (including ID's of attached devices as well as computer model/type and options installed information). The program in cooperation with the build server determines the needed drivers and configuration information according to the rules and downloads them to the target computer. In one embodiment predetermined tasks are performed based on instructions in the build rule. Drivers are transferred to the primary partition of the target computer system 504. When the system is rebooted with the clone image and devices 505, the drivers are installed 506.

In an example embodiment, a target system 307 has a CD-RW optical device attached. The interrogation program detects and records the CD-RW ID. The interrogation program queries the build server 316 for a "rule" for the CD-RW using the ID. It determines from the rule, what must be done. In an alternate embodiment, rule interrogation is done at the build server 316 rather than by the interrogation program. In the alternate embodiment, the build server resolves constraints and provides needed drivers and programs. An example rule would instruct the interrogation program to:

1. Download a file that updates the registry for the operating system on the target computer 307 during the first "boot" (configuration) operation.
2. Download CD-RW software to be installed via a post-build automated process.
3. Download special driver 404 to be installed for that device.
4. Apply other customizations, run other executables or download other code for that CD-RW device.

Based on the Type/Model 325 detected, the interrogation program checks for a "rule" for the target system 307 and performs customizations. An example would:

1. Detect the target system Type/Model 325 is a 2366-97U (IBM ThinkPad® T30).
2. Obtain the rule 402 for the 2366-97U from the build server 316 which states a ThinkPad® T30 must have CD-RW software installed (even if not detected). This might be because it is a prerequisite for other software, or because the user will soon be getting a CD-RW device but it is not yet installed.

The interrogation program, in an example embodiment, checks for application installation prerequisites. The program interrogates the build server rules 402 for all applications defined for the target configuration based on such elements as memory size (RAM), Processor type or number of processors, hard disk size, and target system type/model. In an example embodiment:

1. Interrogation program scans the build database 402 for application rules and finds a rule for MICROSOFT OFFICE XP. The rule says to install the MICROSOFT OFFICE XP if the hardware detected has at least 256 MB RAM, a P4 2.2 GHz processor and 40 GB hard disk.
2. During the first OS boot, MICROSOFT OFFICE XP will be installed.

While the preferred embodiment of the invention has been illustrated and described herein, it is to be understood that the invention is not limited to autonomic computing or the precise construction herein disclosed, and the right is "reserved" to all changes and modifications coming within the scope of the invention as defined in the appended claims.

What is claimed is:

1. A method for creating a replica computer system program image, the method comprising the steps of:
    a build computer system capturing a replica image of a program;
    the build computer system removing components, including driver software, from the replica image of the program, thereby creating an image of the program that lacks driver software;
    the build computer system downloading the created image of the program to a target computer system, in order to begin a build of the program on the target computer system;
    the build computer system receiving from the target computer system, target computer system configuration information;
    the build computer system determining, according to the received target computer system configuration information and according to predetermined rules stored in the build computer system, a set of program components including one or more driver software needed by the target computer system to complete the build of the program on the target computer system;
    the build computer system transmitting one or more program components of the determined set of programmed program components to the target computer system; and
    the build computer system completing the build of the program on the target computer system, such that the program includes the one or more driver software from the set of transmitted program components.

2. The method according to claim 1 wherein the target computer system configuration information comprises any one of an attached device information, a model information of the target computer system, a type information of the target computer system, an amount of memory information of the target computer system or a processor information of the target computer system.

3. The method according to claim 1, wherein the one or more program components comprise any one of a program for determining a computer system configuration information, device drivers, application programs or custom build programs.

4. The method according to claim 1 wherein the determining step further comprises the step of interrogating rules for configuration information.

5. A method for programmatically building a replica computer system program image, the method comprising the steps of:
    capturing a replica image of a program;
    removing components, including driver software, from the replica image of the program, thereby creating an image of the program that lacks driver software;

loading the created image into a target computer system;
loading into the target computer system a replica install program;
executing the replica install program at the target computer system, the target computer system in network communication with a build computer system;
detecting by the replica install program, configuration information of the computer system;
transmitting by way of the install program, the configuration information to the build computer system for evaluation by said build computer system according to a configuration rule to determine a set of program components including one or more driver software needed by the target computer system;
receiving the set of program components from the build computer system;
storing the set of program components at the target computer system; and
building, on the target computer, a replica of the computer system program, the replica including the one or more driver software from the set of stored program components.

6. The method according to claim 5 wherein the executing step comprises the further steps of receiving an update to the install program from the build computer system.

7. The method according to claim 5, wherein the set of program components comprise any one of programs to be run on the target computer system to augment the install process, device drivers or application programs.

8. A computer program product for creating a replica computer system program, the computer program product comprising:
a computer readable medium storing computer readable program code therein for performing a method comprising:
a build computer system capturing a replica image of a program;
the build computer system removing components, including driver software, from the replica image of the program, thereby creating an image of the program that lacks driver software;
the build computer system downloading the created image of the program to a target computer system, in order to begin a build of the program on the target computer system;
the build computer system receiving from the target computer system, target computer system configuration information;
the build computer system determining, according to the received target computer system configuration information and according to predetermined rules stored in the build computer system, a set of program components including one or more driver software needed by the target computer system to complete the build of the program on the target computer system;
the build computer system transmitting one or more program components of the determined set of programmed program components to the target computer system; and
using the one or more program components, the build computer system completing the build of the program on the target computer system, such that the program includes the one or more driver software from the set of transmitted program components.

9. The computer program product according to claim 8 wherein the target computer system configuration information comprises any one of an attached device information, a model information of the target computer system, a type information of the target computer system, an amount of memory information of the target computer system or a processor information of the target computer system.

10. The computer program product according to claim 8, wherein the one or more program components comprise any one of a program for determining a computer system configuration information, device drivers, application programs or custom build programs.

11. The computer program product according to claim 8 wherein the determining step further comprises the step of interrogating rules for configuration information.

12. A computer program product for programmatically building a replica computer system program, the computer program product comprising:
a computer readable medium storing computer readable program code therein for performing a method comprising:
capturing a replica image of a program;
removing components, including driver software, from the replica image of the program, thereby creating an image of the program that lacks driver software;
loading the clone image into a target computer system;
loading into the target computer system a replica install program;
executing the replica install program at the target computer system, the target computer system in network communication with a build computer system;
detecting by the replica install program, configuration information of the computer system;
transmitting by way of the replica install program, the configuration information to the build computer system for evaluation by said build computer system according to a configuration rule to determine a set of program components including one or more driver software needed by the target computer system;
receiving the set of program components from the build computer system;
storing the set of program components at the target computer system; and
using the set of program components, building, on the target computer, a replica of the computer system program, the replica including the one or more driver software from the set of stored program components.

13. The computer program product according to claim 12 wherein the executing step comprises the further steps of receiving an update to the install program from the build computer system.

14. The computer program product according to claim 12, wherein the set of program components comprises any one of programs to be run on the target computer system to augment the install process, device drivers or application programs.

15. A system for creating a replica computer system program, the system comprising:
a network in communication with a target computer system;
a build computer system in communication with the network, wherein the build computer system performs a method comprising:
capturing a replica image of a program;
removing components, including driver software, from the replica image of the program, thereby creating an image of the program that lacks driver software;
downloading the created image of the program to the target computer system, in order to begin a build of the program on the target computer system;

receiving from the target computer system, target computer system configuration information;

determining, according to the received target computer system configuration information and according to predetermined rules stored in the build computer system, a set of program component including one or more driver software needed by the target computer system to complete the build of the program on the target computer system;

transmitting one or more program components of the determined set of programmed program components to the target computer system; and using the one or more program components, completing the build of the program on the target computer system, such that the program includes the one or more driver software from the set of transmitted program components.

16. The system according to claim 15 wherein the target computer system configuration information comprises any one of an attached device information, a model information of the target computer system, a type information of the target computer system, an amount of memory information of the target computer system or a processor information of the target computer system.

17. The method according to claim 15, wherein the one or more program components comprise any one of a program for determining a computer system configuration information, device drivers, application programs or custom build programs.

18. A system for programmatically building a replica computer system program, the system comprising:

a network in communication with a build computer system;

a target computer system in communication with the network, wherein the target computer system performs a method comprising:

capturing a replica image of a computer system program;

removing components, including driver software, from the replica image of the computer system program, thereby creating an image of the computer system program that lacks driver software;

loading the created image into a target computer system;

loading into the target computer system a replica install program;

executing the replica install program at the target computer system, the target computer system in network communication with a build computer system;

detecting by the replica install program, configuration information of the computer system;

transmitting by way of the replica install program, the configuration information to the build computer system for evaluation by said build computer system according to a configuration rule to determine a set of program components including one or more driver software needed by the target computer system;

receiving the set of program components from the build computer system; storing the set of program components at the target computer system; and using the set of program components, building, on the target computer, a replica of the computer system program, the replica including the one or more driver software from the set of stored program components.

19. The system according to claim 18 wherein the executing step comprises the further steps of receiving an update to the install program from the build computer system.

20. The system according to claim 18, wherein the set of program components comprises any one of programs to be run on the target computer system to augment the install process, device drivers or application programs.

* * * * *